Sept. 17, 1935.  D. BAIRD  2,015,051
DRYING AND INCINERATING OF SEWAGE, GARBAGE, ETC
Filed March 30, 1933  2 Sheets-Sheet 2
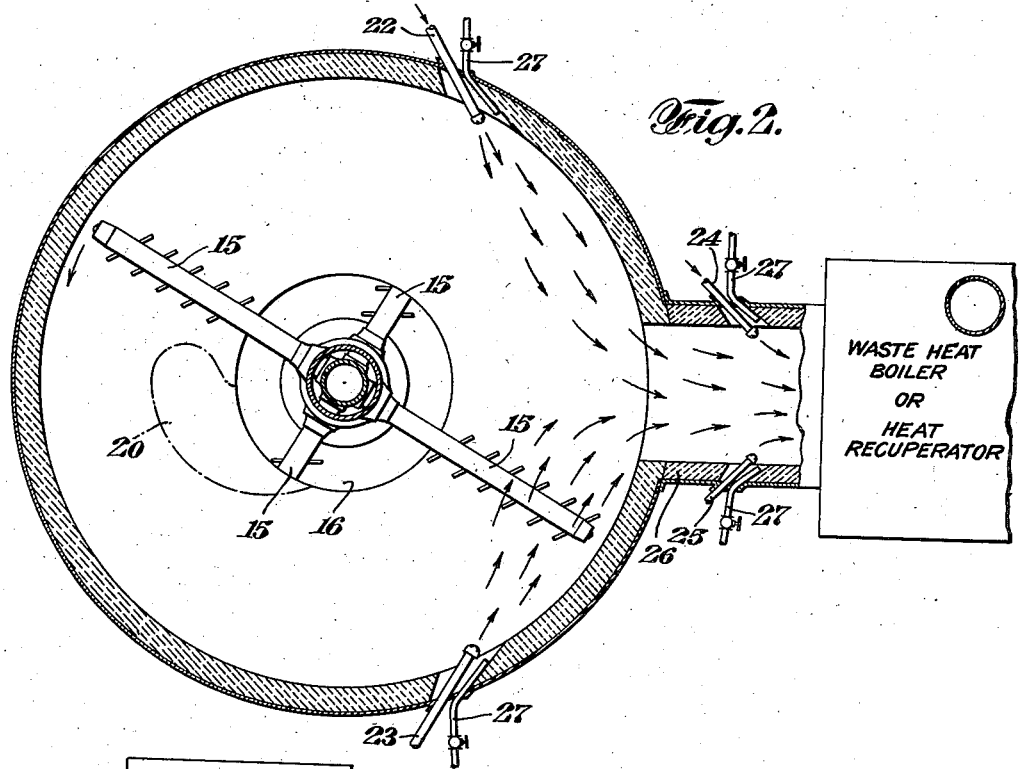
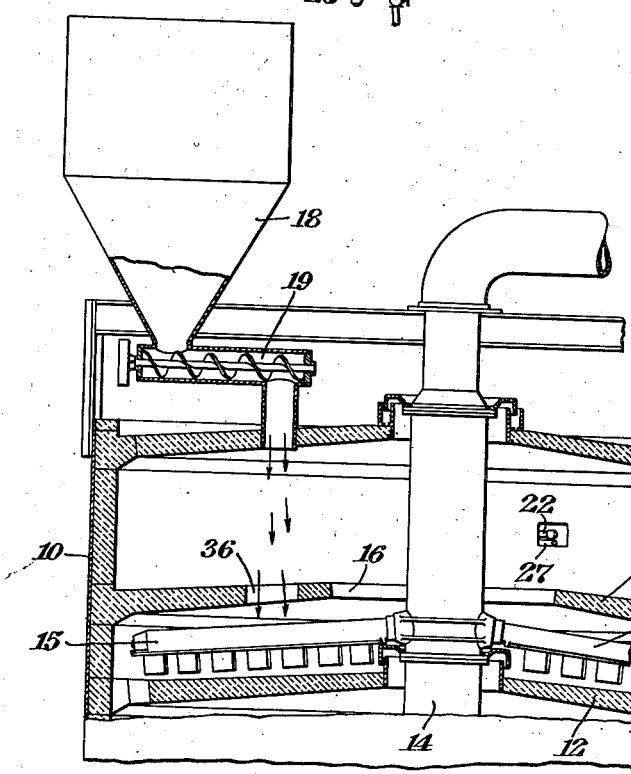
INVENTOR
Dudley Baird
BY
ATTORNEYS Patented Sept. 17, 1935

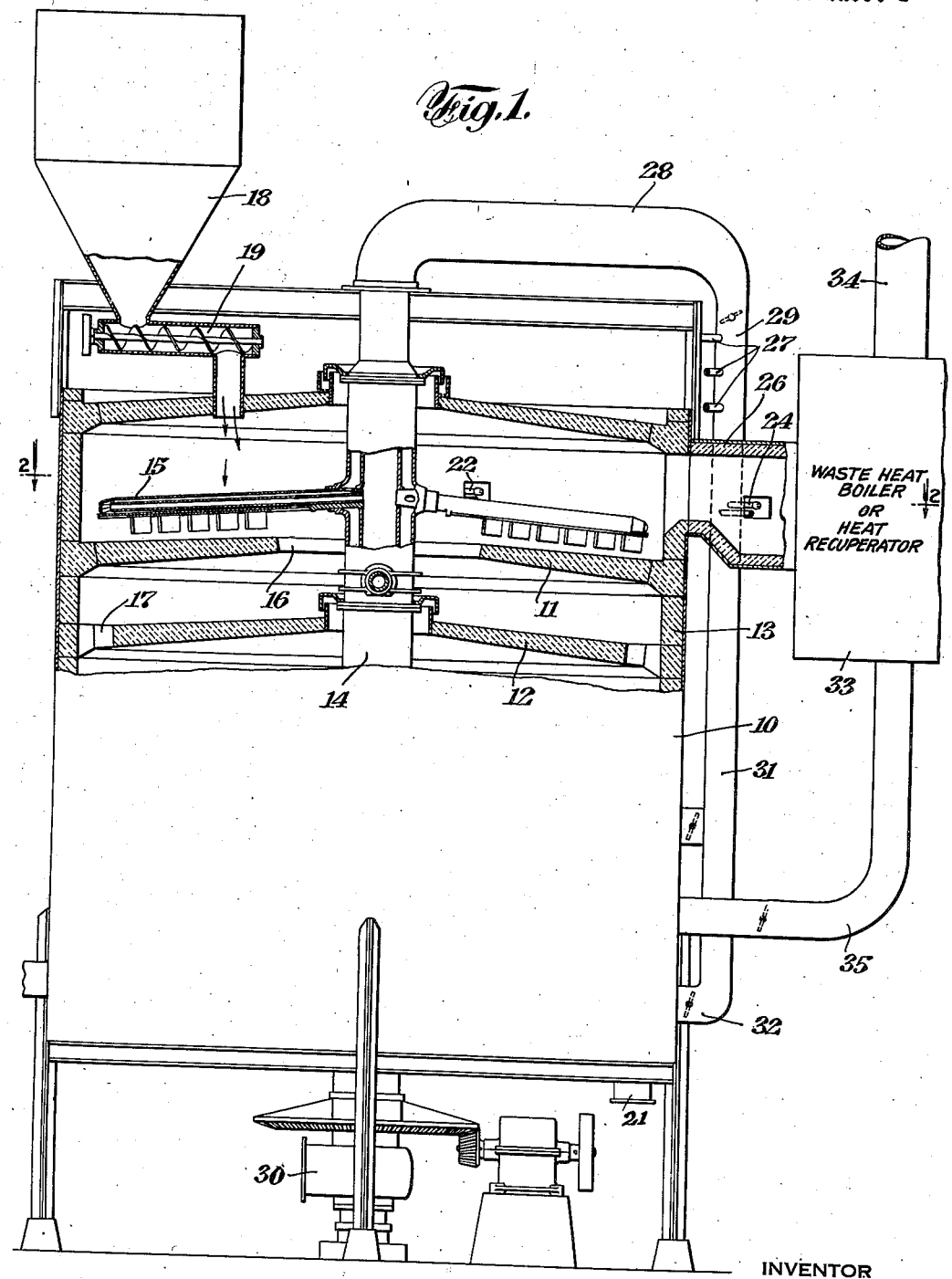

2,015,051

UNITED STATES PATENT OFFICE 2,015,051

DRYING AND INCINERATING OF SEWAGE, GARBAGE, ETC.

Dudley Baird, Berkeley, Calif., assignor to Nichols Engineering & Research Corporation, New York, N. Y., a corporation of Delaware Application March 30, 1933, Serial No. 663,505

2 Claims. (Cl. 110—15)

This invention relates to process and apparatus for treating and incinerating sewage, garbage and the like waste materials, and the elimination of obnoxious odors from the gases evolved from the material during its treatment.

The invention provides an improved process and apparatus for efficiently and rapidly drying such material, incinerating or burning the dried material and quickly and efficiently eliminating by the use of heat the obnoxious odors from the gases produced during the process. In accordance with this invention, such materials may be uniformly reduced to an ash, which may be readily disposed of without annoyance and the gaseous products at the same time may be treated while still within the furnace or just as they are passing out of the furnace, and reduced to such form that they may be carried off in a stack or otherwise, also without annoyance.

Various further and more specific objects, features and advantages will clearly appear from the detailed description given below, taken in connection with the accompanying drawings which form a part of this specification and illustrate, merely by way of example, various embodiments of the apparatus of the invention.

The invention consists in such novel features, arrangements and combinations of parts as may be shown and described in connection with the furnace arrangements herein disclosed, by way of example only, and as illustrative of preferred embodiments, together with such novel methods and steps of processes as may also be described herein.

In the drawings, Fig. 1 illustrates partly in section, furnace apparatus for drying and incinerating the material and for treating the gases to eliminate odors therefrom;

Fig. 2 is a sectional view taken substantially along the line 2—2 of Fig. 1; and Fig. 3 is a view similar to Fig. 1, but showing portions of an alternative embodiment of the apparatus.

In the drawings a multiple hearth furnace of the Herreshoff type is indicated at 10 having a plurality of superposed hearths as at 11 and 12, etc., surrounded and supported by the usual furnace wall structure as at 13. A central rotatable shaft 14 may be provided with radially extending rabble arms as at 15 for rabbling the material over each of the hearths in succession down through the furnace. The central shaft and rabble arms may be provided with internal cooling conduits, such for example as shown and described in the patent to Herreshoff, No. 976,175, granted November 22, 1910. Each of the hearths is provided with gas ports, hearth 11, for example, being provided with a central port or opening 16, and hearth 12 with peripheral ports or openings as at 17—succeeding alternate hearths respectively being provided with central and peripheral openings or ports whereby the gases evolved from the material under treatment are permitted to pass upwardly through the furnace countercurrent to the path of travel of the material.

As to constructional features not specifically referred to herein, the usual design of furnaces of this general type may be followed; also reference may be had to my Patent No. 1,669,925 of May 15, 1928.

The material to be treated may be first preferably ground to break up large pieces and then filtered to remove such quantities of moisture as may be readily disposed of in that way. Then the material may be fed from a hopper as at 18 through a screw conveyor 19 into the space above the hearth 11. The material will fall upon the hearth 11 and will be rabbled over a relatively small area 20 (Fig. 2) on this hearth and thence through the opening 16 down to the succeeding hearths. As the material falls on to the hearth 11 and travels over the area 20, it is heated somewhat, but is removed from this area rather quickly so that it will not cool to any substantial degree the space above the hearth 11, because as will hereinafter be explained, it is desired to maintain this space at a relatively high temperature for treating the gases. On the hearth 12 and on the succeeding hearths, the material is efficiently and uniformly dried and incinerated, the heat of combustion of the material being utilized for this purpose and supplemented to the extent necessary, depending upon the character of the material, by oil burners or other heating means applied at the middle or lower hearths. The rabbling of the material over the succeeding hearths insures uniform and rapid treatment with the result that it is reduced to a rather finely divided ash which may be passed out through an outlet 21 at the bottom of the furnace.

The gases evolved from the material under treatment may pass upwardly through the furnace over the several hearths and through the ports thereof, and finally to the space above the hearth 11. While the hydrocarbon content of some of these gases may be burned within the furnace during travel of the gases over the hearths where incineration occurs, yet a considerable quantity of such gases will be evolved at the upper hearths, at the hearth 12 for example, and it is therefore important to treat such gases for the elimination of odors before the gases are discharged to the atmosphere. For this purpose the gases are allowed to pass into the space above the top hearth 11, which may be somewhat larger than the spaces above the other hearths, and in this space the gases may be subjected to a temperature of from 1000 to 1500° F. with sufficient air to insure decomposition and burning of the hydrocarbon content of such gases and the substantial elimination of obnoxious odors therefrom. This temperature may be readily secured by introducing oil burners as indicated at 22, 23, 24 and 25 directed through the furnace walls and through the walls of the outlet 26 in such a way as to insure that all of the gas will be heated to the necessary temperature while it is within or adjacent the top of the furnace. The necessary air to insure burning of the gases may be introduced through conduits adjacent the oil burners or by injecting such air with the burning oil, as through conduits as at 27. To enhance the efficiency of the apparatus, the conduits 27 may be supplied with air preheated by passing through the cooling conduits of the rabble arms and shaft, suitable connecting conduits as at 28 and 29 being provided for this purpose. That is, cool air may be blown in at 30 to the bottom of the interior conduit of the shaft 14, such air being conducted through interior conduits of each of the rabble arms, thence to the exterior conduits of the rabble arms and shaft and out through the top of the shaft to conduits 28 and 29. The details of construction of the rabble arm and shaft cooling conduits of this type are well known and are shown and described for example in my above mentioned Patent No. 1,669,925 of May 15, 1928.

Such of the air which is preheated in the rabble arms and shaft and which may not be needed in the gas treating chamber at the top of the furnace may be conducted as by conduits 31 and 32 to the lower hearths of the furnace and there used for combustion of the material being treated. Alternatively, if desired, some of the air which is preheated in the cooling conduits may be discharged directly into the furnace from openings in the furnace shaft in the manner shown for example in my above mentioned patent.

After the gases are treated to remove odors, they may be passed through a waste heat boiler or heat recuperator as at 33, and thence to a stack 34 or other means for discharging the same to the atmosphere. If a waste heat boiler is used, a substantial amount of the heat of the hot gases may be recovered in the boiler for power purposes or if a heat recuperator is used, air may be preheated therein for introduction into the lower part of the furnace to enable efficient combustion of the material being treated. A conduit for such purpose is indicated at 35. As indicated, the various preheated air conduits may be provided with dampers enabling accurate control of the combustion and temperature conditions in various parts of the furnace. By adjustment of these dampers, sufficient air may be admitted at the various points to insure proper combustion without providing an excess of air tending to decrease the efficiency of the arrangement.

With the above described arrangement, the obnoxious gases may be very efficiently treated by heat, since the treatment is effected while the gases are still within the top of the furnace or just as they are leaving the top of the furnace, and hence before any opportunity is afforded for the gases to become cooled with a consequent waste of heat, as would occur if the gases are treated at some point apart from the furnace. Also the efficiency of the above described arrangement for treating the gases is substantially enhanced by utilizing the preheated air obtained from the rabble arm cooling conduits. This permits the use of sufficient air to insure thorough burning of the odoriferous content of the gases, and by thus using preheated air, less fuel is required at the burners 23 to 25. The efficiency of the process is further improved by immediately passing the hot treated gases through the waste heat boiler or heat recuperator, thus recovering a substantial amount of heat which may be used for power purposes or in efficiently preheating the air supply to the furnace.

The embodiment of the invention illustrated in Fig. 3 is similar to that above described, with the exception that the material introduced to the furnace by the conveyor 19 may be passed directly through the space above the hearth 11, through an opening 36 in such hearth, and on to a hearth 12. This enables the material to be introduced at the desired point on hearth 12 and yet permits the material to quickly pass through the space above hearth 11 without cooling the gases in such space.

While the invention has been described in detail with respect to particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent of the United States is:

1. Apparatus for treating sewage, garbage and the like waste materials, comprising a furnace having a plurality of superposed hearths, rabbling members for advancing the material over each hearth and from hearth to hearth down through the furnace, said rabbling members having internal cooling conduits, a chamber within the top of the furnace, the hearths being provided with ports whereby gases evolved from the material under treatment are admitted to said chamber before passing out of the furnace, means for burning fuel within said chamber, and connections for conducting air preheated in said rabbling members into said chamber, whereby the gases before passing out at the top of the furnace may be raised to a temperature sufficient to decompose or burn the odoriferous content thereof.

2. The process of treating sewage, garbage or similar material, which comprises passing said material downwardly through a plurality of superposed zones of a chamber while first drying and then burning the same, temporarily retaining said material in each of a plurality of said zones, moving said material horizontally through each of said zones by a rabbling action, passing the gases produced from the material upwardly through said zones, subjecting such gases while within said chamber to a high temperature to substantially eliminate obnoxious odors therefrom, passing the heated gases along a path disposed in heat-exchanging relation with respect to a stream of air, and supplying said stream of air to said chamber and passing same through said zones countercurrent to the movement of said material for supporting combustion thereof.

DUDLEY BAIRD.